US007675958B2

(12) United States Patent
Stultz et al.

(10) Patent No.: US 7,675,958 B2
(45) Date of Patent: Mar. 9, 2010

(54) INTRA-CAVITY NON-DEGENERATE LAGUERRE MODE GENERATOR

(75) Inventors: Robert D. Stultz, Lakewood, CA (US); Steven C. Matthews, Incline Village, NV (US); Billie G. Hendry, Hawthorne, CA (US)

(73) Assignee: Raytheon Company, Waltham, MA (US)

( * ) Notice: Subject to any disclaimer, the term of this patent is extended or adjusted under 35 U.S.C. 154(b) by 205 days.

(21) Appl. No.: 11/497,824

(22) Filed: Aug. 2, 2006

(65) Prior Publication Data

US 2010/0020833 A1 Jan. 28, 2010

(51) Int. Cl.
*H01S 3/08* (2006.01)
(52) U.S. Cl. .......................................... 372/92; 372/19
(58) Field of Classification Search ................. 343/753; 372/100, 92, 105; 359/497
See application file for complete search history.

(56) References Cited

U.S. PATENT DOCUMENTS

| 3,373,376 | A | * | 3/1968 | Clark et al. ................... 372/27 |
| 6,084,552 | A | * | 7/2000 | Robertson et al. ............ 343/753 |
| 6,317,450 | B1 | | 11/2001 | Reeder |
| 6,643,000 | B2 | | 11/2003 | Fluckiger |
| 6,744,038 | B2 | * | 6/2004 | Wang et al. .................. 250/251 |
| 6,784,420 | B2 | * | 8/2004 | Wang et al. .................. 250/251 |
| 6,833,542 | B2 | * | 12/2004 | Wang et al. .................. 250/251 |
| 2003/0128732 | A1 | | 7/2003 | Ishizu |

FOREIGN PATENT DOCUMENTS

EP          1 662 623 A    5/2006

OTHER PUBLICATIONS

R. Oron, et al., 'Continuous-Phase Elements Can Improve Laser Beam Quality,' Optical Society of America, Optics Letters, vol. 25, No. 13, Jul. 1, 2000.*
A.E. Siegman, 'Lasers,' University Science Books, Mill Valley, California, 1986, p. 647.
Amiel A Ishaaya et al, "Efficient Selection of High-Order Laguerre-Gaussian . . . ", IEEE Journal Quantum Electronics, Jan. 1, 2003, p. 76,79, vol. 39, No. 1, USA.
Eyyuboglu et al, "Propagation characteristics of higher-order . . . ", Optics Comm, Aug. 1, 2006, vol. 264, No. 1, p. 25-34.

* cited by examiner

*Primary Examiner*—Minsun Harvey
*Assistant Examiner*—Tuan N. Nguyen
(74) *Attorney, Agent, or Firm*—Christie, Parker & Hale, LLP

(57) ABSTRACT

A lasing method including the steps of providing a laser resonator; utilizing birefringence compensation in said resonator whereby said resonator is induced to operate in a Laguerre-Gaussian higher order mode; and utilizing polarized outcoupling of lasing energy at said higher order mode from said resonator. In the illustrative application, the laser resonator is a high-power, solid-state laser resonator. In the specific embodiment, the inventive method further includes the step of changing an outcoupling preference for a non-degenerate high-order Laguerre-Gaussian mode. In one embodiment, the step of changing outcoupling preference includes the step of changing an outcoupling polarization. In another embodiment, the step of changing outcoupling preference includes the step of changing an orientation of a roof edge of a prism in the laser resonator. Lower order Laguerre modes are discouraged from appearing in an output of the resonator by adding loss at the center of the rod aperture of the resonator or detuning the orientation of a first or a second quarter-wave plate. In the illustrative embodiment, the gain lifetime of the resonator is longer than an interpulse period thereof.

44 Claims, 7 Drawing Sheets

INTENSITY

*INTENSITY*

+π (WHITE)
−π (BLACK)

*PHASE*

COUNTER-CLOCKWISE 'CCW'

INTENSITY

+π (WHITE)
−π (BLACK)

PHASE

CLOCKWISE 'CW'

INTRA-CAVITY NON-DEGENERATE LAGUERRE MODE GENERATOR

This invention was made with Government support under Contract No. F29601-97-C-0001 awarded by the Department of the Army. Accordingly, the United States Government may have certain rights in this invention

BACKGROUND OF THE INVENTION

1. Field of the Invention

The present invention relates to lasers. More specifically, the present invention relates to high-energy or high average power lasers.

2. Description of the Related Art

High-power lasers (i.e. lasers operating at power levels in excess of 100 watts) are used in a variety of commercial, industrial and military applications. For these applications, there is an ongoing need for more power and more efficiency. In addition, beam quality is typically limited in high-power lasers due to thermal distortion of optical elements, primarily by heat loading of the gain medium. This problem is exacerbated at high power levels. While some have approached this problem with larger aperture sizes, with this approach the beam quality and efficiency are typically affected adversely.

Another approach involves restricting the beam size in order to improve the beam quality. However, this generally limits the power of the resulting beam. That is, with an improved output aperture area fill, higher power is not possible without damaging the associated optical system. Consequently, designers of high power lasers have been forced to compromise between beam size or power and beam quality and vice versa.

Hence, there is an ongoing need in the art for a system or method for improving the power and efficiency of high-power, particularly solid-state, lasers. Specifically, there is a need for a system for improving the output aperture area fill of high-power, solid-state lasers.

SUMMARY OF THE INVENTION

The need in the art is addressed by the lasing method of the present invention. The inventive method includes the steps of providing a laser resonator; utilizing radial birefringence compensation in said resonator whereby said resonator is induced to operate in a high-order non-degenerate Laguerre-Gaussian mode; and utilizing polarized outcoupling of lasing energy at said higher order mode from said resonator.

In the illustrative application, the laser resonator is a high-power, solid-state laser resonator. In the specific embodiment, the inventive method further includes the step of changing an outcoupling preference, which includes the step of changing an outcoupling polarization. In another embodiment, the step of changing outcoupling preference includes the step of changing an orientation of a roof edge of a prism in the laser resonator.

Lower order Laguerre modes may be discouraged from appearing in the output of the resonator by adding loss at the center of the rod aperture of the resonator or detuning the orientation of a first or a second quarter-wave plate. In the illustrative embodiment, the gain lifetime of the resonator is longer than an interpulse period thereof.

DESCRIPTION OF THE INVENTION

Figure 1A:
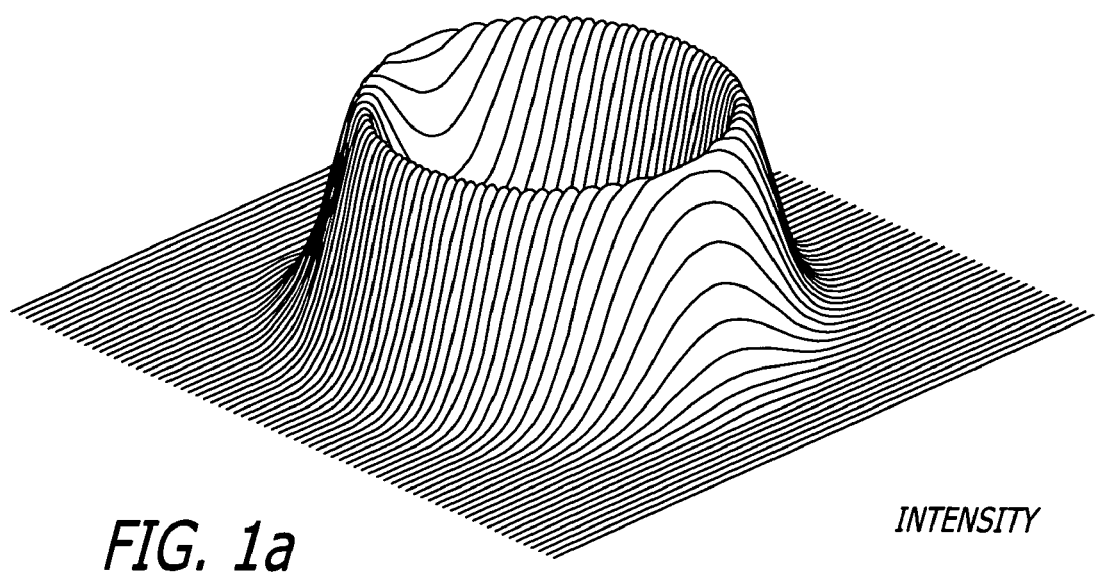
FIG. 1a is diagram showing an illustrative intensity profile for a counter-clockwise non-degenerate Laguerre-Gaussian mode for mode p=0 and order m=8.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In accordance with the present teachings, non-degenerate Laguerre-Gaussian ring modes are created in a laser resonator, especially in a high-power, solid-state laser resonator. Laguerre-Gaussian modes are characterized by a spiral phase front, $\exp(im\theta)$, and possess angular momentum. The phase rotates from zero to $2\pi m$ where 'm' is an integer that defines the order of the mode. The phase is undefined in the center of the beam. Hence, the intensity in the center is zero and a cross-section of the output appears as a ring.

Conventionally, Laguerre mode operation was generated through the use of spiral phase plates. In accordance with the present teachings, Laguerre mode is generated using a solid-state resonator with birefringence compensation using quarter-wave plates and a roof prism. A preference is created for a desired mode using a polarization outcoupling arrangement.

The utilization of the present teachings within a polarization output coupled (POC) laser resonator cavity causes a preference of one "handedness" (clockwise or counter-clockwise) of the spiral phase front of these modes. This "handedness" has also been referred to as "right-handed torsion" and "left-handed torsion", as well.

In particular, the highest order non-degenerate Laguerre mode that fits within the limiting aperture of the laser cavity is strongly preferred over all others, because it has the lowest output coupling (or least loss). Hence, by using the present teachings, a laser can be operated in a single transverse mode (high-order non-degenerate Laguerre mode), with a beam area significantly larger than that of a fundamental ($TEM_{00}$) mode. This makes significantly higher single-transverse-mode laser power possible, compared with $TEM_{00}$ operation. External (outside the resonator cavity) phase correction of a single non-degenerate Laguerre mode can be achieved and has been reported in the literature, see "*Continuous-phase elements can improve laser beam quality*" by R. Oron, et al., published in Optics Letters, vol. 25, no. 13, pp. 939-941 (2000).

This invention may be implemented with conventional optical elements currently used in high-power laser systems. The invention utilizes a radial thermal-stress birefringence profile that naturally occurs in a high average power, cooled, cylindrical solid-state laser rod.

Laguerre-Gaussian modes are an alternative, but equally general, basis set to Hermite-Gaussian modes for a laser resonator and provide a stable platform for high-energy laser delivery.

The field amplitude, $u_{pm}(r,\theta,z)$, for a non-degenerate Laguerre mode is given by (ref: A. E. Siegman, Lasers, (University Science Books, Mill Valley, Calif., 1986), p. 647):

$$u_{pm}(r, \theta, z) = \sqrt{\frac{2p!}{(1+\delta_{0m})\pi(m+p)!}} \frac{\exp i(2p+m+1)\psi(z)}{w(z)} \left(\frac{\sqrt{2}r}{w(z)}\right)^m L_p^m\left(\frac{2r^2}{w^2(z)}\right) \exp\left[-ik\frac{r^2}{2q(z)} \pm im\theta\right] \quad [1]$$

Where, $$\frac{1}{q(z)} = \frac{1}{R(z)} - i\frac{\lambda}{\pi w^2(z)}$$

$$w(z) = w_0 \sqrt{1 + \left(\frac{z}{z_R}\right)^2}$$

$$R(z) = z + \frac{z_R^2}{z}$$

$$z_R = \frac{\pi w_0^2}{\lambda}$$

$$\tan\psi(z) = \frac{\pi w^2(z)}{R(z)\lambda}$$

These modes are characterized by spiral, or helical, phase fronts that can either have a clockwise (CW) or counter-clockwise (CCW) spin. These modes carry (orbital) angular momentum, even when linearly polarized. The spiral phase term is given by $\exp(\pm im\theta)$, where m is a positive integer and $\theta$ is the azimuthal angle in the plane perpendicular to the propagation axis z. For the discussion here, we are concerned only with the p=0 modes.

For a given order m, the intensity profiles of CW and CCW Laguerre modes are identical. Therefore, the non-degenerate modes are difficult to produce in a conventional laser cavity since both the $\exp(im\theta)$ and $\exp(-im\theta)$ modes are equally preferred, and appear simultaneously in a 'degenerate' form where linear combinations can form $\cos(m\theta)$ and/or $\sin(m\theta)$ variations. This degenerate form has no spiral phase front and is non-torsional. FIG. 1 shows examples of CCW and CW non-degenerate (torsional) Laguerre modes.

FIG. 1a is diagram showing an illustrative intensity and phase profile for a counter-clockwise non-degenerate Laguerre-Gaussian mode for mode p=0 and order m=8.

Figure 1B:
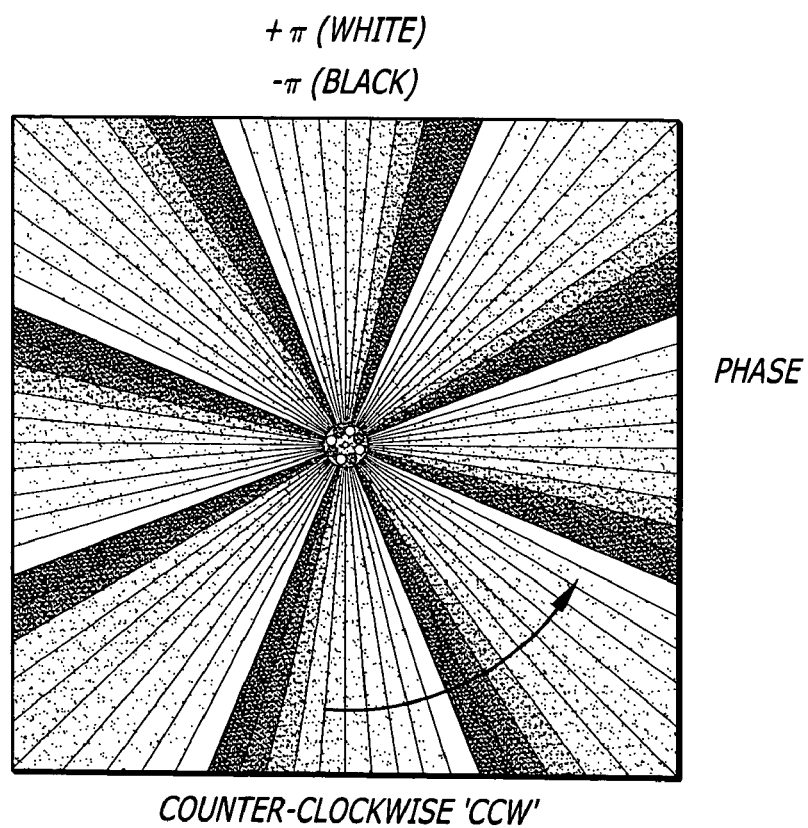
FIG. 1b is diagram showing an illustrative phase profile for a counter-clockwise non-degenerate Laguerre-Gaussian mode for mode p=0 and order m=8.
Figure 1C:
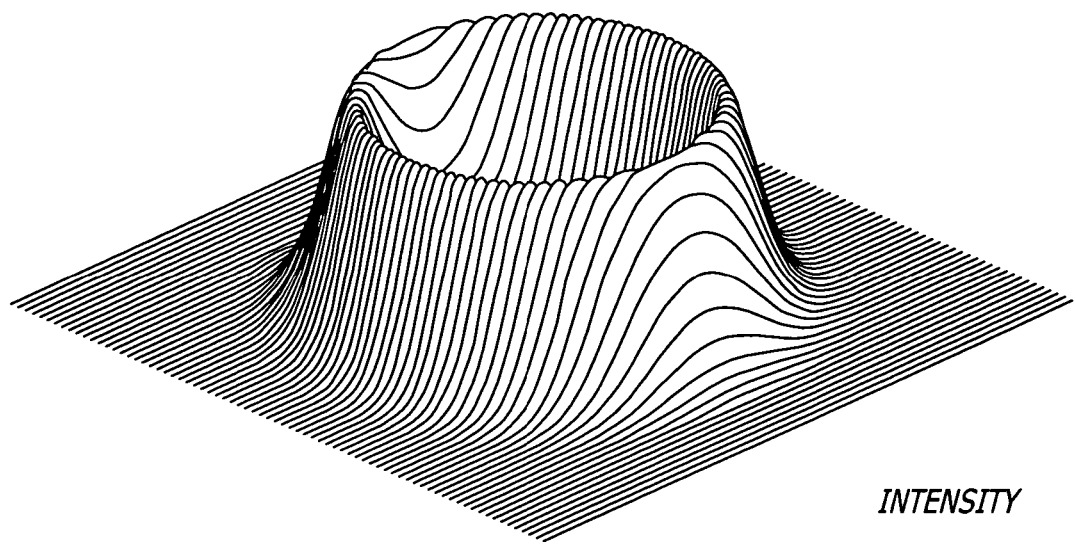
FIG. 1c is diagram showing an illustrative intensity profile for a clockwise non-degenerate Laguerre-Gaussian mode for mode p=0 and order m=8.
Figure 1D:
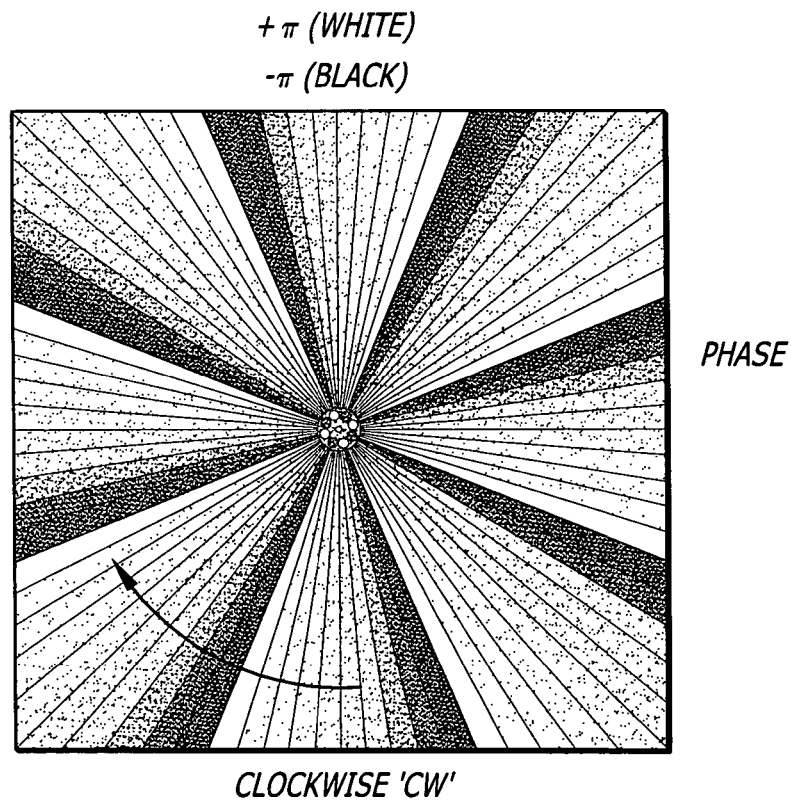
FIG. 1d is diagram showing an illustrative phase profile for a clockwise non-degenerate Laguerre-Gaussian mode for mode p=0 and order m=8.

FIG. 1b is diagram showing an illustrative intensity and phase profile for a clockwise non-degenerate Laguerre-Gaussian mode for mode p=0 and order m=8.

Figure 2A:
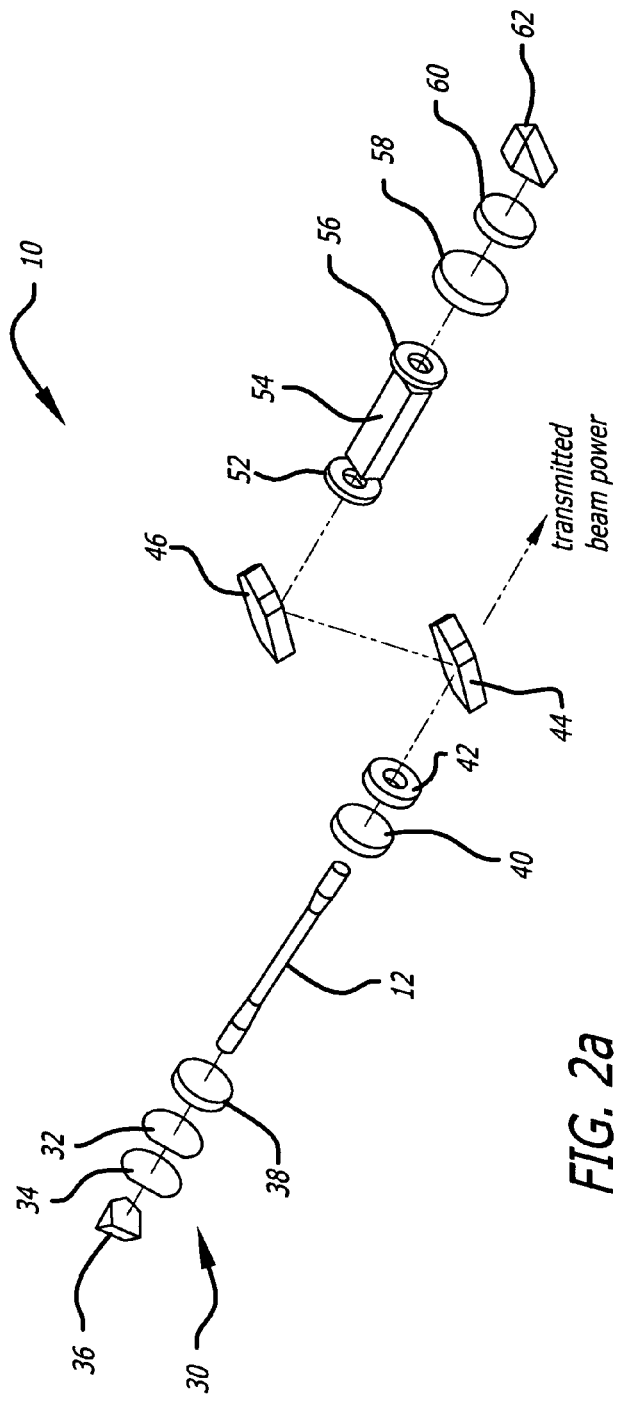
FIG. 2a is an optical schematic in accordance with an illustrative implementation of the present teachings.

FIG. 2a is a schematic of an optical system used in connection with the present teachings. The system 10 incorporates a cylindrical solid-state laser rod 12. The rod 12 is constructed of ytterbium-doped YAG. The thermal load induced by pumping the rod creates a radial birefringence profile, which manifests itself as the familiar 'ring & brush' pattern when viewed through crossed or uncrossed polarizers at both ends of the rod (See FIGS. 3(a) and (b)).

An alignment wedge 38 is included for resonator angular alignment in a conventional manner. A beam output by the rod 12, herein denoted the "input-beam-power," passes through a thermal lens compensator (negative lens) 40 and an aperture 42 before being split by a polarization beam splitter 44.

The 's' polarized energy is reflected by the polarizer 44 to a fold mirror 46 and on to the Q-switch leg of the resonator. In the illustrative embodiment, the Q-switch leg of the resonator includes a first Q switch aperture 52, an electro-optic crystal (BBO) 54, a second Q switch aperture 56, a positive lens 58, an alignment wedge 60, and a resonator prism 62. Energy of 'p' polarization, herein denoted "transmitted-beam-power," is transmitted by the polarizer 44 as output from the resonator.

In accordance with the present teachings, the system 10 (FIG. 2a) is used to create a different transmitted-beam-power to input-beam-power ratio (outcoupling), depending on the Laguerre order, m, and the handedness (CW or CCW) of the spiral phase front.

An optical arrangement 30, such as that disclosed and claimed in U.S. Pat. No. 6,317,450 entitled REEDER COMPENSATOR issued Nov. 13, 2001 to R. A. Reeder, the teachings of which are incorporated herein by reference, is included for the purpose of thermal birefringence compensation. In accordance with the present teachings, diffraction in the optical path of the thermal compensator 30 is used in part to produce non-degenerate Laguerre ring modes. These modes are produced with polarization output coupling (POC), as discussed more fully below.

In the illustrative embodiment, the thermal birefringence compensator 30 includes first and second quarter-wave plates 32 and 34 and a resonator prism 36. The quarter-wave plates 32 and 34 are arranged in accordance with the teachings of the above-identified Reeder patent.

Figure 2B:
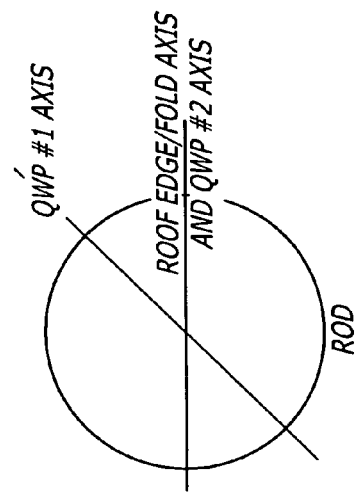
FIG. 2b is a diagram showing quarter-wave plate orientations with respect to the rod of the optical system in accordance with the present teachings.

FIG. 2b is a diagram showing quarter-wave plate orientations with respect to the rod of the optical system in accordance with the present teachings.

Figure 2C:
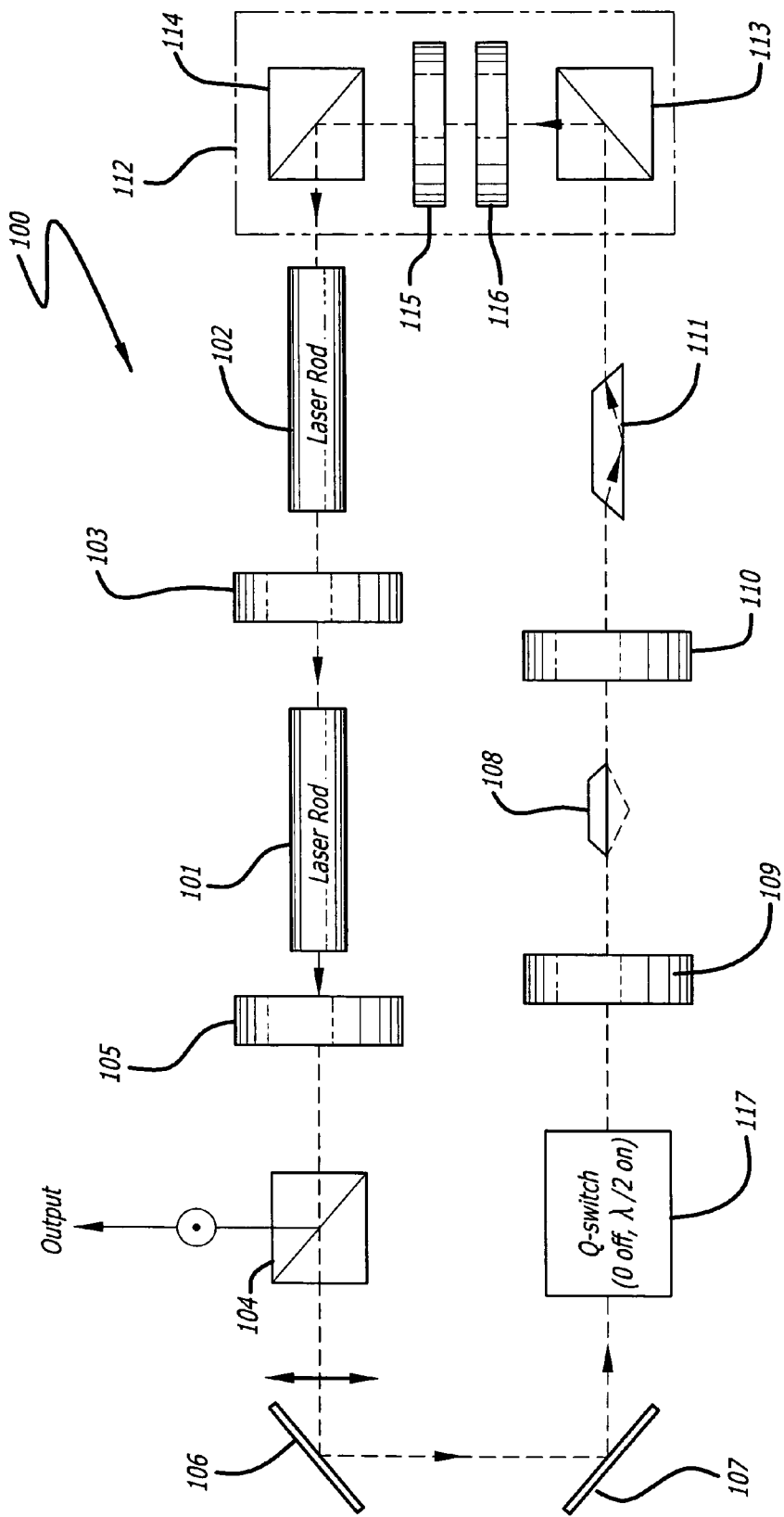
FIG. 2c is an optical schematic of an alternative second embodiment of the present teachings.

FIG. 2c is an optical schematic of an alternative second embodiment of the present teachings. In this (second) embodiment a ring resonator 100 is formed, where the intra-cavity laser light propagates in only one direction around the resonator, as indicated in FIG. 2(c). The opposing propagation direction is discouraged by use of an optical diode 112. This differs from the first embodiment where the laser light oscillates back and forth (both directions) between two Benson prisms.

Laser rods 101 and 102 are cylindrical rods composed of a laser-active solid-state material. For this particular embodiment, it is necessary that the birefringence profiles of the two laser rods be close to the same, since in effect we are using the birefringence of one rod is used to compensate for the birefringence of the other. This can be accomplished by specifying the same shape, size, and material for both rods. Then, by optically pumping and cooling (along the outside barrel surface of each rod) using the same means, the resultant thermal birefringence profiles of the two rods will be, as a consequence, the same.

There may be other schemes not employing two rods to serve the same purpose in this embodiment. The fundamental teaching of the first and second embodiments is that there probably will be a radial birefringence and there should be a corresponding compensation of that birefringence. Those skilled in the art will appreciate that other designs may be employed without departing from the scope of the present teachings.

Birefringence compensation, in this embodiment, is accomplished by rotating the polarization state of the light between the laser rods using Faraday 90°-polarization rotator 103. Alternatively, a pair of half-wave plates may be used in place of 103 to perform the same function.

When linearly polarized light enters laser rod 102 (from right to left in the figure), laser rod 102 will induce birefringence, with radial and tangential polarization components, on the light field. Faraday 90° rotator 103 (or alternatively, a pair of half-wave plates) will rotate the polarization state by 90° so that the radial component will now become tangential, and the tangential component will become radial with respect to laser rod 101. The sum effect of laser rods 101 and 102 and Faraday 90° rotator 103 is that there is no net phase difference between radial and tangential polarization components. The polarization state of the light exiting laser rod 101 is therefore the same as what was incident on laser rod 102 (no change).

Outcoupling for this embodiment is accomplished using a linear polarizer 104 and half-wave plate 105 (or alternatively a Faraday rotator in place of the plate 105). Component 105 acts to spoil the polarization of the light coming from laser rod 101, in order that some of the light is reflected from the polarizer 104, to form the output of the laser, and the rest is transmitted through polarizer 104 and continues to propagate in the ring resonator. Those skilled in the art will appreciate that other means of polarization outcoupling designs may be employed without departing from the scope of the present teachings. Indeed, For either of the embodiments described herein, it is not necessary that the outcoupling be based on polarization. It is only necessary that a loss discrimination based on polarization exist somewhere within the resonator cavity, i.e. it need not be the loss that goes into the output of the laser resonator.

Fold mirrors 106 and 107 serve only to turn the light beam so as to form a ring resonator. These could (alternatively) be replaced with two right-angle prisms or a single 180° folding prism.

Either resonator 10 or 100 can be operated either continuously (non-pulsed) or in a pulsed mode using Q-switch 117. In the continuous mode of operation, Q-switch 117 is replaced by a half-wave plate, 90° rotator, or Faraday rotator which rotates the linear (p-polarized) polarization state, from polarizer 104, by 90°. In the pulsed mode of operation, Q-switch 117 forms an individual pulse by switching the Q of the resonator from low to high when a voltage or signal is applied to it.

In this particular embodiment, the Q-switch is an electro-optic crystal which forms a half-wave polarization retardation when the proper voltage is applied. This half-wave retardation will effectively rotates the polarization state by 90°, thereby switching the resonator to high-Q. It should be noted that other Q-switching (such as acousto-optic or passive, such as a saturable absorber) or mode-locking (active or passive) methods may be used as well within the scope of the present teachings. Descriptions of (passive and active) Q-switching and mode-locking can be found throughout the literature, such as in A. Siegman, Lasers.

A dove prism 108 serves to rotate the light beam intensity pattern about its axis of propagation by an angle $2\phi$ (where $\phi$ is the angle of orientation of the dove prism 108). Rotating the beam is crucial to non-degenerate Laguerre mode generation, otherwise modes that are not azimuthally-symmetric may appear. For all embodiments described herein, the total beam rotation in the resonator should not be 360°, or a multiple of 360°, after a round trip.

The two half-wave plates 109 and 110 serve to preserve the linear polarization state through the dove prism 108. The half-wave plate 109 rotates the linear polarization direction to a polarization-eigenstate of the dove prism 108, i.e. either s- or p-polarized light relative to the TIR (total internal reflection) bounce occurring in the dove prism 108. Half-wave plate 110 rotates the linear polarization state back to its original (the state before half-wave plate 109) orientation.

The dove prism 108 also causes the spin direction of Laguerre spiral phase front to reverse its direction. The dove prism 111 serves to reverse the spin direction of the Laguerre spiral phase front back to its original direction, before dove prism 108. The spiral phase spin direction is reversed in each of the dove prisms, thereby requiring an even number of dove prisms in the resonator. An odd number of dove prisms would cause a reversal of spiral phase direction after a round trip and therefore would discourage the build up of a non-degenerate Laguerre mode. This principle applies to all embodiments described herein, that is, the spiral phase direction after each round trip must be conserved.

An optical diode 112 is needed in the ring resonator to prevent laser oscillation/propagation from occurring in one of the two possible directions. In this particular embodiment, two linear polarizers, 112 and 113 are used, in conjunction with a half-wave plate 115 and Faraday rotator 116, as an optical diode 112.

The following is a description of how this particular optical diode works. Light entering polarizer 113 (from dove prism 111) will become s-polarized after this polarizer and then is rotated +45° by the Faraday rotator 116. S-polarization is taken here to mean the linear polarization state that is normal to the plane of incidence of the polarizing surface in polarizer 113. A positive angle of rotation is taken here to mean one that while looking along the direction that the beam is traveling, the polarization orientation is rotated in a clockwise direction (a negative angle is counter-clockwise). (Those skilled in the art will appreciate that the invention is not limited to the polarization orientations shown.) The half-wave plate 115 then rotates the polarization by −45°, or back to its original orientation (which is also "s-polarized" relative to polarizer 114). This light will nominally be 100% reflected by polarizer 114 and thus continue to propagate in the ring resonator. Light traveling in this direction will therefore build up inside the ring resonator.

Light traveling in the opposite direction, or that entering polarizer 114 (from laser rod 102) will be s-polarized (with respect to polarizer 114) and then rotated by −45° by half-wave plate 115. The Faraday rotator 116 will rotate the polarization by a further −45° so that the light is now "p-polarized" with respect to polarizer 113. This light is nominally 100% transmitted through polarizer 113 and will be lost to the ring resonator. Light traveling in this direction will therefore not build up in the resonator.

It should be noted that a Faraday rotator will turn the polarization orientation in a direction that is independent of the light propagation direction. If the propagation direction is switched, the rotation direction (as described above) will also switch from clockwise to counter-clockwise due to the change in perspective. This is not true for a half-wave plate, where the rotation direction does depend on the propagation direction and will remain either clockwise or counter-clockwise in both propagation directions, due to the change in perspective.

Those skilled in the art will appreciate that other resonator designs may be employed without departing from the scope of the present teachings.

Figure 3A:
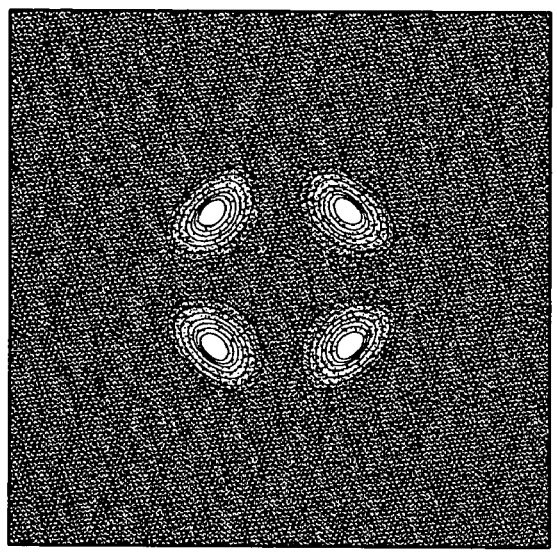
FIG. 3a is a photograph showing one wave of rod birefringence when viewed with a crossed polarizer.

FIG. 3a is a diagram showing one wave of rod birefringence when viewed with a crossed polarizer.

Figure 3B:
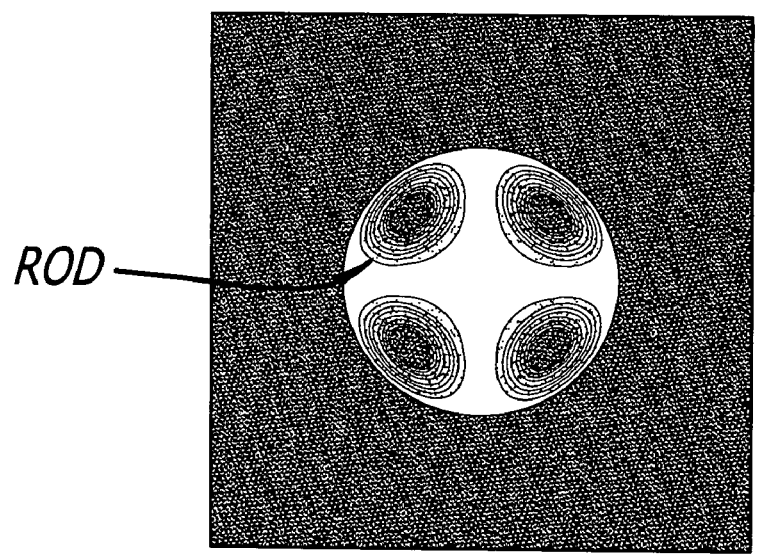
FIG. 3b is a photograph showing one wave of rod birefringence when viewed with an uncrossed polarizer.

FIG. 3b is a diagram showing one wave of rod birefringence when viewed with an uncrossed polarizer.

Figure 4:
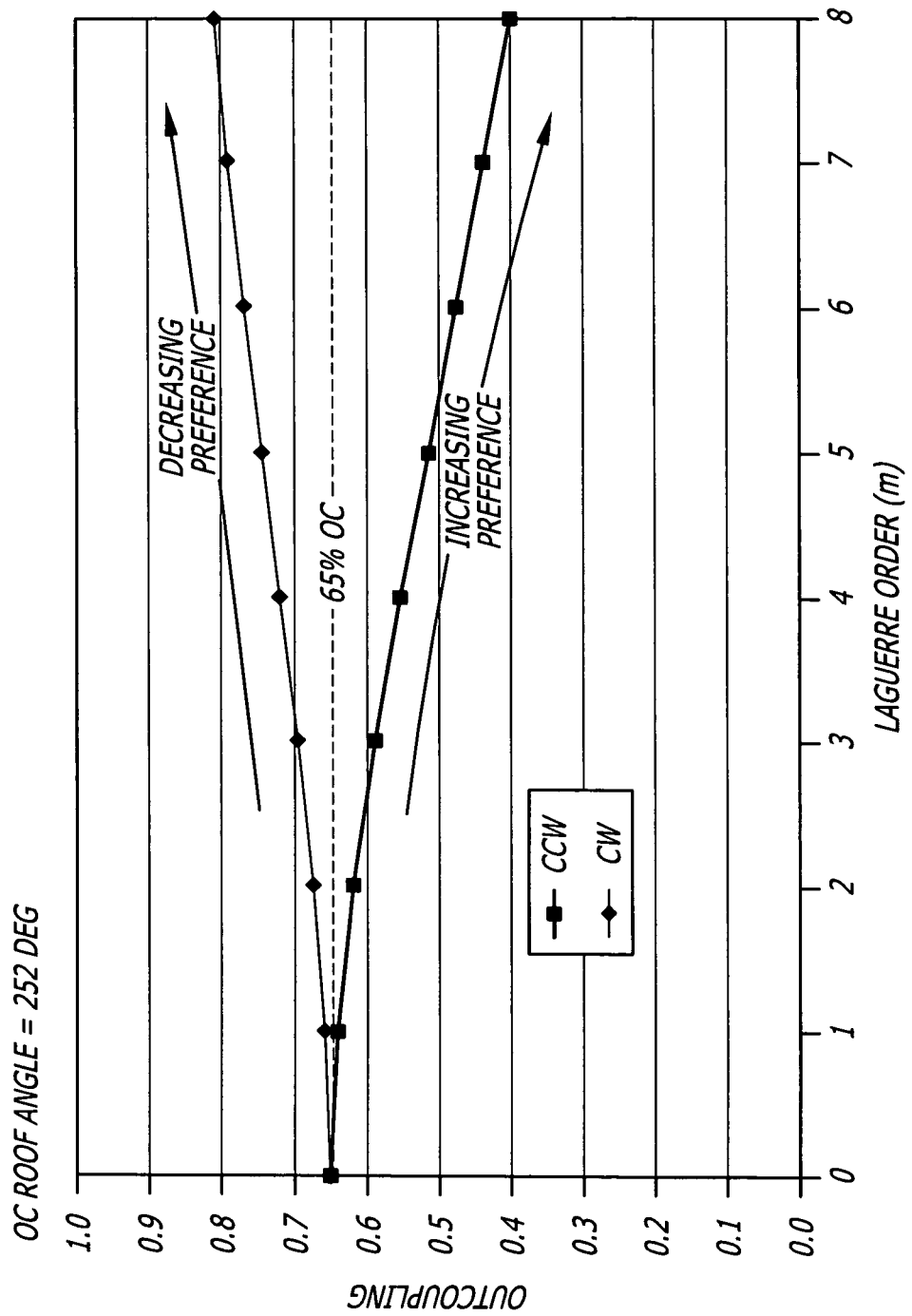
FIG. 4 is a plot of outcoupling versus Laguerre order and handedness using the present teachings in a polarized outcoupled laser resonator.

FIG. 4 is a plot of outcoupling versus Laguerre order and handedness using the present teachings in a polarized outcoupled laser resonator such as the system 10 of FIG. 2a for a roof angle of 252°. The plot of FIG. 4 was generated from a simulation using GLAD (General Laser Analysis and Design) diffractive propagation software, from Applied Optics Research, located in Woodland, Wash. Those skilled in the art will appreciate that the present teachings can be applied to other prism angles.

The plot in FIG. 4 clearly shows that the outcoupling is significantly lowered, with increasing Laguerre order m, for the CCW spiral phase handedness. The opposite is true for Laguerre modes with CW handedness. Since the diffractive loss for a given Laguerre order is the same, regardless of phase handedness, the CCW is preferred due to the significantly lower outcoupling loss. This preference can be switched from CCW to CW, by either outcoupling on the orthogonal polarization (s- instead of p-polarization, in FIG. 2) or by changing the orientation of the (Benson prism) roof edge. The same principle applies for other prism angles as well.

Figure 5C:
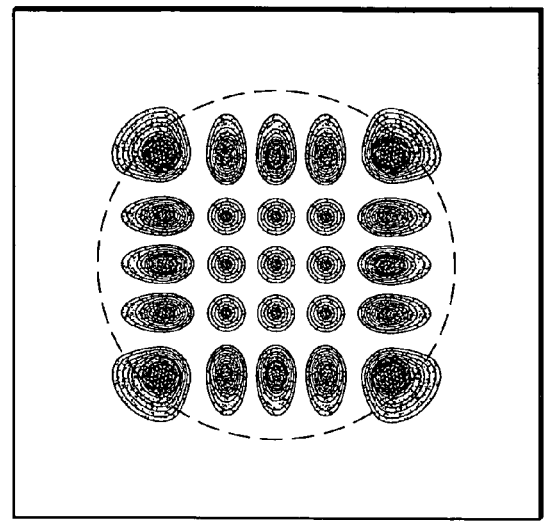
FIG. 5c is a diagram showing a cross-section of a laser beam with outcoupling at 60% in Hermite-Gaussian mode.
Figure 5A:
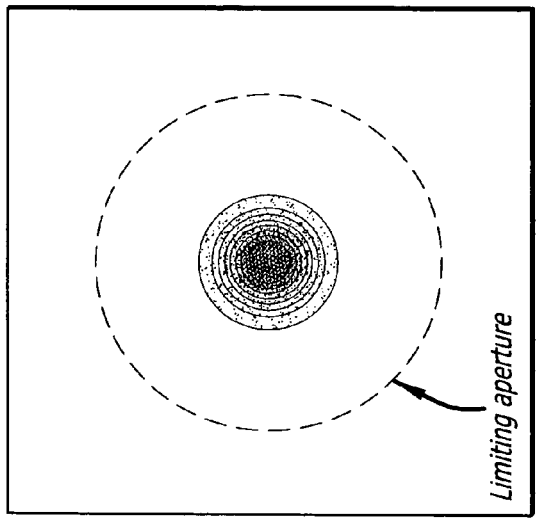
FIG. 5a is a diagram showing a cross-section of a laser beam with outcoupling at 65% in $TEM_{00}$ mode.
Figure 5B:
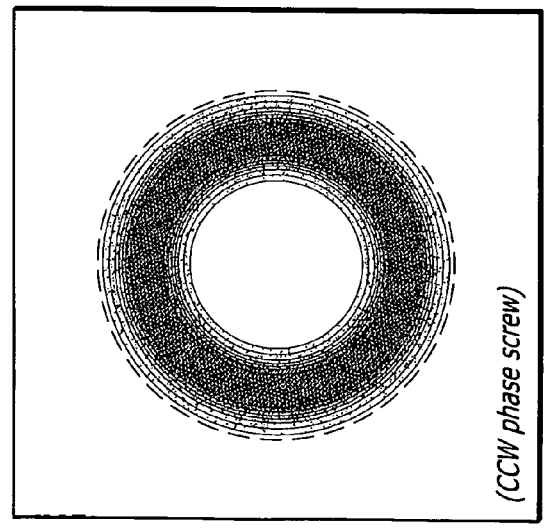
FIG. 5b is a diagram showing a cross-section of a laser beam with outcoupling at 40% in Laguerre mode.

Using the present teachings within a POC resonator, the highest-order non-degenerate Laguerre mode that fits within the limiting resonator aperture (a circular aperture is preferred) becomes the preferred mode of the resonator. It should also be noted that Hermite-Gaussian modes do not display this outcoupling preference. FIGS. 5a-c illustrate this point, using the present teachings in a polarized outcoupled laser resonator such as the system 10 of FIG. 2a for a roof angle of 252°.

FIG. 5a is a diagram showing a cross-section of a laser beam with outcoupling (OC) at 65% in $TEM_{00}$ mode.

FIG. 5b is a diagram showing a cross-section of a laser beam with outcoupling at 40% in Laguerre mode.

FIG. 5c is a diagram showing a cross-section of a laser beam with outcoupling at 60% in Hermite-Gaussian mode.

In general, the higher the fundamental cavity mode, the higher the Laguerre order that will dominate. That is, the highest order Laguerre mode (that fits in limiting resonator aperture) is the preferred lowest loss mode.

In accordance with the present teachings, the Laguerre mode is encouraged rather than suppressed. In the preferred embodiment, the resonator is adapted run in only a single high-order Laguerre mode for optimum consistency. Having the capability of operating in a single high-order LG mode yields not only good consistency, but also much improved rod fill, over the lowest-order ($TEM_{00}$) mode.

The output phase pattern, although generally deleterious to far-field (FF) beam quality by itself, is well-behaved and therefore correctable with external optics. This can be in the form of a photo-etched phase correction plate.

In accordance with the present teachings, some 'loss' is added at the center of the rod aperture to completely discourage any lower order Laguerre modes from appearing in the output inasmuch as it is preferable to have only one mode lase. Gain saturation of one area in the laser rod during one pulse will result in higher gain in other areas in the subsequent pulse. This should occur if the gain (fluorescence) lifetime is longer than the interpulse period.

There are a number of ways this central 'loss' could be accomplished without departing from the scope of the present teachings. In addition, a de-tuning the orientation of one of the quarter-wave plates may prevent all but the highest order LG mode from lasing as an alternative.

In the best mode, a laser rod, or rods, with a cylindrical cross-section, i.e., one that possesses azimuthal symmetry is used. The laser rod(s) should have a radial birefringence profile. Radial birefringence is a natural consequence of optical pumping and cooling of the laser rod(s) on their outside barrel surface. There should also be a compensation of this radial birefringence. Two birefringence compensation methods are described in the embodiments discussed herein, but those skilled in the art will appreciate that other designs may be employed without departing from the scope of the present teachings.

Other means of generating a birefringence profile may be conceived that are equivalent to the birefringence profile produced by a laser rod in the embodiments described herein. Use of a component (or components) such as this to replace the birefringence profile function of a solid-state laser rod would not depart from the scope of the present teachings. In such case, other laser-active mediums could be used to produce the gain required for laser operation.

In summary, the following are conditions recommended for the preferential generation of non-degenerate Laguerre-Gaussian modes with either of the embodiments described herein:

1. A stable resonator, as defined by a confined Gaussian mode for the resonator, according to standard definitions and teachings contained in standard textbooks such as Siegman, Lasers.
2. Radial birefringence, and its compensation, as described herein.
3. Diffraction, physically inherent in the finite propagation paths that exist in any physical resonator.
4. Selective loss for one polarization component, a property of polarization output coupling, or by other means as described herein.
5. Near-field beam turning (rotation of the laser intensity field about its propagation axis) that does not repeat after a round trip of the laser resonator. This is accomplished using a pair of Benson prisms in the first embodiment and with a pair of dove prisms in the second embodiment. Without beam turning (or rotation), modes with intensity patterns that do not have azimuthal symmetry may appear.
6. Conservation of torsional phase direction for a resonator round trip. Optical elements that reverse the Laguerre phase spin direction must be encountered in even numbers for a resonator round trip, so that the Laguerre phase spin direction is preserved after a round trip. In the present embodiments the optical elements that cause Laguerre spin direction reversals are the Benson prisms (first embodiment) and the dove prisms (second embodiment).

Those skilled in the art will appreciate that other methods may be employed without departing from the scope of the present teachings.

Thus, the present invention has been described herein with reference to a particular embodiment for a particular application. Those having ordinary skill in the art and access to the present teachings will recognize additional modifications applications and embodiments within the scope thereof. For example, the present teachings can also be used in LADAR systems to obtain a Doppler signature from rotating targets. See U.S. Pat. No. 6,643,000 entitled EFFICIENT SYSTEM AND METHOD FOR MEASURING TARGET CHARACTERISTICS VIA A BEAM OF ELECTROMAGNETIC ENERGY and issued to D. Fluckiger, November 2003, the teachings of which are incorporated herein by reference.

It is therefore intended by the appended claims to cover any and all such applications, modifications and embodiments within the scope of the present invention.

What is claimed is:

1. A lasing system including:
   means for providing a laser resonator;
   means for effecting birefringence compensation in said resonator wherein said resonator is induced to operate in a non-degenerate Laguerre-Gaussian higher order mode; and
   means, disposed within said resonator, for effecting a polarized outcoupling of lasing energy at said higher order mode from said resonator;
   wherein said laser energy is output with a spiral phase
   wherein a spin direction of the spiral phase in the non-degenerate Laguerre mode is preserved after one round-trip through the laser resonator; and
   wherein the means for effecting a polarized outcoupling of lasing energy comprises a polarization beam splitter.

2. The invention of claim 1 further including means for effecting a selective loss for a polarization component.

3. The invention of claim 1 wherein said system includes a stable resonator.

4. The invention of claim 3 wherein said system includes a stable resonator as defined by a confined Gaussian mode.

5. The invention of claim 1 wherein at least one element in said system has radial birefringence.

6. The invention of claim 5 wherein said system includes means for compensating for said radial birefringence.

7. The invention of claim 1 wherein at least one element in said system is a diffractive element.

8. The invention of claim 1 further including means for effecting a near-field beam turning.

9. The invention of claim 8 wherein said means for effecting a near-field beam turning includes means for effecting a rotation of a laser intensity field about a propagation axis that does not repeat after a round trip of the laser resonator.

10. The invention of claim 9 wherein said means for effecting a near-field beam turning includes first and second Benson prisms.

11. The invention of claim 9 wherein said means for effecting a near-field beam turning includes first and second dove prisms.

12. The invention of claim 8 further including means for effecting conservation of torsional phase direction for a resonator round trip.

13. The invention of claim 12 wherein said means for effecting conservation of torsional phase direction for a resonator round trip includes optical elements that reverse a Laguerre phase spin direction.

14. The invention of claim 13 wherein said optical elements that reverse a Laguerre phase spin direction include optical elements arranged to ensure that a beam illuminates said elements in even numbers for a resonator round trip so that the Laguerre phase spin direction is preserved after a round trip.

15. The invention of claim 14 wherein said optical elements that reverse a Laguerre phase spin direction include first and second Benson prisms.

16. The invention of claim 14 wherein said optical elements that reverse a Laguerre phase spin direction include first and second dove prisms.

17. The invention of claim 1:
   wherein said resonator has a solid-state laser rod with an aperture; and
   wherein said resonator comprises a birefringence compensation arrangement including first and second quarter-wave plates and a roof prism in optical alignment with said rod.

18. The invention of claim 17:
   wherein the means, disposed within said resonator, for effecting a polarized outcoupling of lasing energy comprises a polarization beam splitter in optical communication with a second roof prism.

19. The invention of claim 17:
   wherein the means, disposed within said resonator, for effecting a polarized outcoupling of lasing energy comprises an optical path including a polarization beam splitter, a fold mirror, a Q-switch and a second roof prism.

20. A lasing method comprising:
    providing a laser resonator;
    effecting birefringence compensation in said resonator wherein said resonator is induced to operate in a non-degenerate Laguerre-Gaussian higher order mode;
    effecting, within said resonator, a polarized outcoupling of lasing energy at said higher order mode from said resonator;
    effecting a spin on the lasing energy in a direction, wherein the lasing energy is output with a spiral phase; and
    preserving the spin direction of the spiral phase in the non-degenerate Laguerre mode after one round-trip through the laser resonator.

21. The invention of claim 20 wherein said laser resonator is a high-power laser resonator.

22. The invention of claim 21 wherein said laser resonator is a solid-state laser resonator.

23. The invention of claim 22 further including the step of changing an outcoupling preference.

24. The invention of claim 23 wherein said step of changing outcoupling preference includes the step of changing an outcoupling polarization.

25. The invention of claim 23 wherein said step of changing outcoupling preference includes the step of changing an orientation of a roof edge of a prism in said laser resonator.

26. The invention of claim 20 further including the step of discouraging any lower order Laguerre modes from appearing in an output of said resonator.

27. The invention of claim 26 wherein said resonator has a solid-state laser rod with an aperture.

28. The invention of claim 27 further including the step of adding loss at the center of the rod aperture.

29. The invention of claim 27 wherein said resonator includes a birefringence compensation arrangement.

30. The invention of claim 29 wherein said arrangement includes first and second quarter-wave plates and a roof prism in optical alignment with said rod.

31. The invention of claim 30 further including the step of detuning the orientation of said first or said second quarter-wave plate to prevent lower order Laguerre modes from lasing.

32. The invention of claim 20:
wherein the resonator comprises a gain lifetime and an interpulse period;
wherein the gain lifetime is longer than the interpulse period.

33. The invention of claim 20 wherein azimuthal beam turning is provided within the laser resonator to further discriminate against modes other than non-degenerate Laguerre modes.

34. The invention of claim 20:
wherein the effecting, within said resonator, a polarized outcoupling of lasing energy at said higher order mode from said resonator comprises effecting, within said resonator, a polarized outcoupling of lasing energy at said higher order mode from said resonator using a polarization beam splitter.

35. A lasing method comprising:
providing a high-power, solid-state laser resonator;
effecting birefringence compensation in said resonator whereby said resonator is induced to operate in a non-degenerate Laguerre-Gaussian higher order mode;
effecting, within said resonator, a polarized outcoupling of lasing energy at said higher order mode from said resonator; and
discouraging any lower order Laguerre modes from appearing in an output of said resonator;
wherein said laser energy is output with a spiral phase;
wherein a spin direction of the spiral phase in the non-degenerate Laguerre mode is preserved after one round-trip through the laser resonator; and
wherein the means for effecting a polarized outcoupling of lasing energy comprises a polarization beam splitter.

36. The invention of claim 35 further including the step of changing an outcoupling preference.

37. The invention of claim 36 wherein said step of changing outcoupling preference includes the step of changing an outcoupling polarization.

38. The invention of claim 36 wherein said step of changing outcoupling preference includes the step of changing an orientation of a roof edge of a prism in said laser resonator.

39. The invention of claim 35 wherein said resonator has a solid-state laser rod with an aperture.

40. The invention of claim 39 further including the step of adding loss at the center of the rod aperture.

41. The invention of claim 39 wherein said resonator includes a birefringence compensation arrangement.

42. The invention of claim 41 wherein said arrangement includes first and second quarter-wave plates and a roof prism in optical alignment with said rod.

43. The invention of claim 42 further including the step of detuning the orientation of said first or said second quarter-wave plate to prevent lower order Laguerre modes from lasing.

44. The invention of claim 35:
wherein the resonator comprises a gain lifetime and an interpulse period;
wherein the gain lifetime is longer than the interpulse period.

* * * * *